United States Patent [19]

Webber et al.

[11] Patent Number: 4,591,976

[45] Date of Patent: May 27, 1986

[54] MULTIPLE TASK ORIENTED PROCESSOR

[75] Inventors: Douglas G. Webber, San Diego; George C. Schenck, Hermosa Beach, both of Calif.

[73] Assignee: The United States of America as represented by the Secretary of the Air Force, Washington, D.C.

[21] Appl. No.: 505,165

[22] Filed: Jun. 17, 1983

[51] Int. Cl.[4] ..................... G06F 12/16; G06F 12/06; G06F 15/52

[52] U.S. Cl. .................................................. 364/200

[58] Field of Search ........ 364/423, 527, 200 MS File, 364/900 MS File

[56] References Cited

U.S. PATENT DOCUMENTS

| | | | |
|---|---|---|---|
| 4,044,337 | 8/1977 | Hicks et al. | 364/200 |
| 4,164,787 | 8/1979 | Aranguren | 364/200 |
| 4,219,873 | 8/1980 | Kober et al. | 364/200 |
| 4,251,864 | 2/1981 | Kindell et al. | 364/200 |
| 4,296,464 | 10/1981 | Woods et al. | 364/200 |
| 4,412,281 | 10/1983 | Works | 364/200 |
| 4,413,327 | 11/1983 | Sabo et al. | 364/900 |
| 4,414,624 | 11/1983 | Summer, Jr. et al. | 364/200 |
| 4,445,198 | 4/1984 | Eckert | 364/900 |
| 4,462,077 | 7/1984 | York | 364/300 |

Primary Examiner—James D. Thomas
Assistant Examiner—Thomas Lee
Attorney, Agent, or Firm—Donald J. Singer; Bernard E. Franz

[57] ABSTRACT

The computer system for missile guidance comprises five parallel processors interconnected by a global bus; with each processor having its own CPU, program memory, temporary memory, and two critical variable memories, interconnected by a local bus. The program memory and critical variable memory are hard MNOS to survive nuclear radiation. Each processor has its own cycle time, synchronized by a master clock. In each processor, the cycle has three phases for intercommunication, task processing, and critical variable storage. Thus the critical variables are stored only after task processing is completed.

2 Claims, 8 Drawing Figures

MULTIPLE TASK ORIENTED PROCESSOR

RIGHTS OF THE GOVERNMENT

The invention described herein may be manufactured and used by or for the Government of the United States for all governmental purposes without the payment of any royalty.

BACKGROUND OF THE INVENTION

This invention relates to a computer with parallel processing units organized as a multiple task oriented processor, and in particular to a computer system in which critical variables are stored so as to permit quick recovery from an event which causes a temporary loss of information in the fast operating memory, and prevents normal processing.

Many missiles, spacecraft, and pilotless aircraft are conventionally provided with a guidance and control system including navigation means for automatically operating the flight controls to cause the missile or aircraft to fly in accord with a desired mission. The guidance system may include an on-board computer, a ground computer, or a combination of on-board and ground computers. For military applications, one requirement of such guidance systems is the ability to survive the radiation from a nuclear "event", e.g., the system must be nuclear radiation hardened.

Computers designed to withstand severe, weapon induced radiation environment have traditionally used exotic, expensive memory and integrated circuit (IC) technologies (plated wire memories and dielectrically isolated ICs). Computers that can recover from transient radiation events have had to resort to complex hardware/software circumvention and recovery techniques.

SUMMARY OF THE INVENTION

An object of the invention is to lower the initial and long term cost of a radiation hardened computer for a guidance system, while at the same time minimizing the long term repair problems. Specific objectives are to simplify circumvention/recovery, eliminate the need for expensive plated wire memory, and enhance throughput.

The computer according to the invention achieves a high operation speed, to provide the desired throughput, with a multiple task oriented organization using parallel processors interconnected via a global bus.

A feature is that each processor has its own circumvention and recovery routine, and its own critical-variable memory which is written into only during a special time period at the end of each cycle, after normal processing is completed.

DETAILED DESCRIPTION

FUNCTIONAL REQUIREMENTS

Figures 1, 1A:
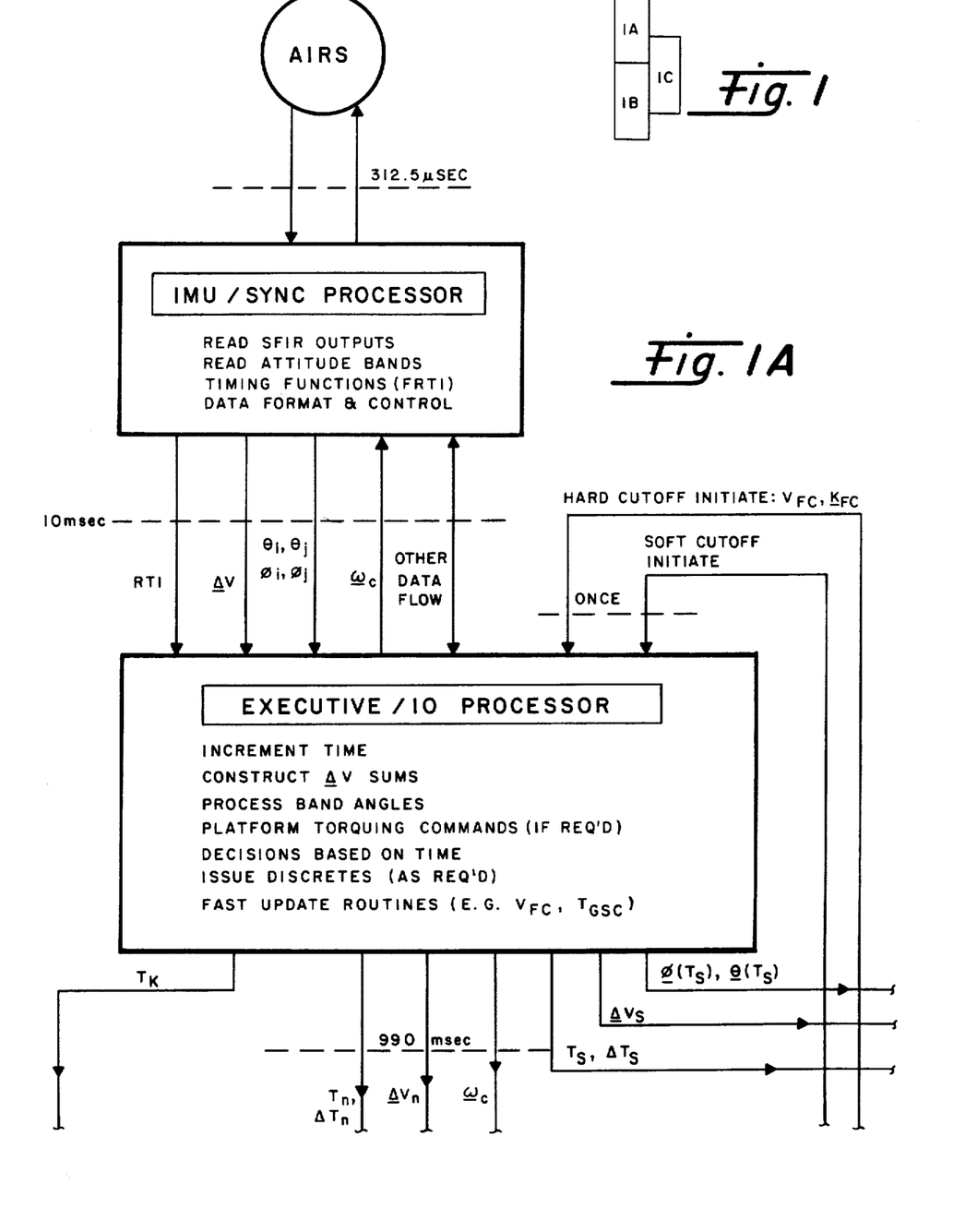
FIGS. 1A–1C arranged as shown in FIG. 1 comprise a functional flow diagram for a multiple processor in a computer for a missile system.
Figure 1B:
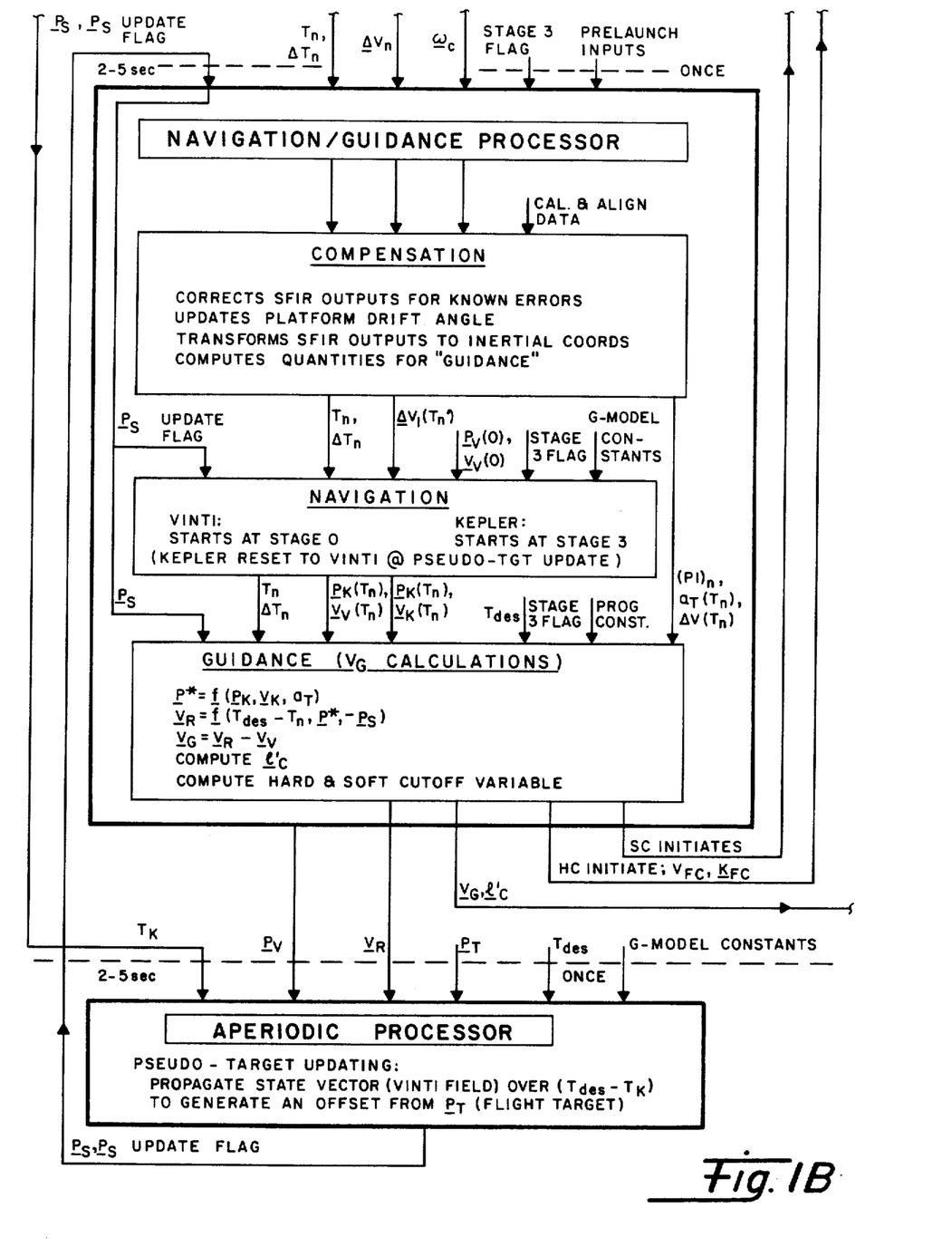
Figure 1C:
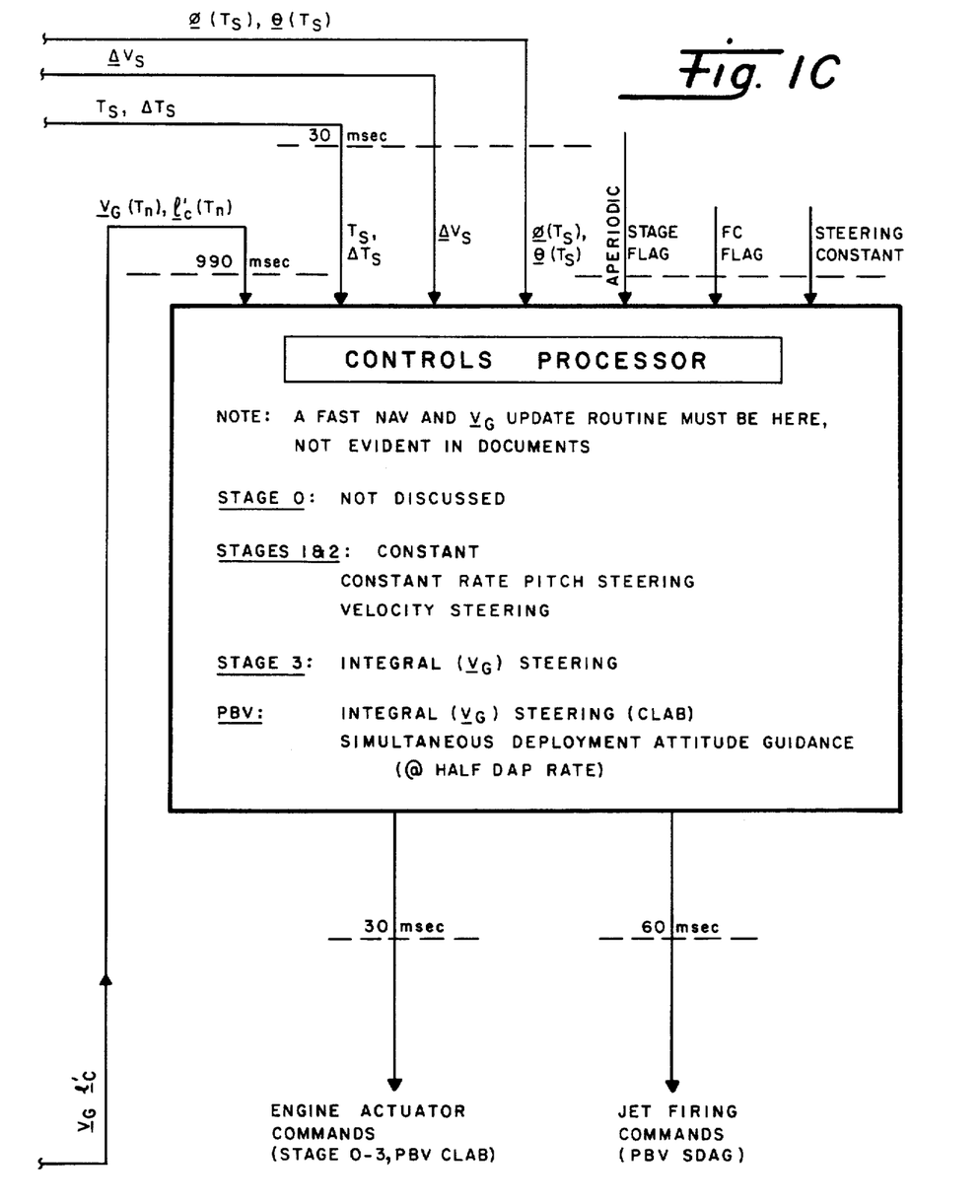

The first step in defining a multiprocessor system is the partitioning of the functional requirements into processing tasks. The multiprocessor architecture was designed to be in harmony with the general functional requirements for guidance and control. The principal element of inflight guidance include an inertial measurement unit (IMU) to indicate specific force and vehicle attitude, a flight computer (FC) to calculate current state and an algorithm for achieving the desired end-state, a control system to carry out commands from the flight computer, and propulsion system(s) to provide the requisite energy. FIG. 1 summarizes, in flow form, the essence of guidance and control for a missile system. The discussion below will expand on the characteristics of each "processor" and conclude with some observations of what can be implied generically.

AIRS

The Advanced Inertial Reference Sphere (AIRS) is assumed to be the IMU. AIRS generates the prime indication of sensed specific force (summed $\Delta V$'s), vehicle inertial attitude (attitude bands) and reference timing for the software (312.5 $\mu$sec clock).

IMU/Sync Processor

This processor is essentially a special purpose I/O device which "reads" $\Delta V$'s and attitude from the AIRS on a 312.5 $\mu$sec time slice. It can "write" into AIRS to generate command rates ($\omega_c$) to the platform's stable member. The IMU/Sync processor furnished the real time interrupt (RTI) to the lower frequency processing elements.

Executive/IO Processor

This processor iterates at an assumed 100 Hz rate. Within each 10 millisecond segment it must update time for software, accept summed $\Delta V$'s and band angles from the IMU/Sync processor, make certain time-based decisions, issue certain discretes, and do some fast update routines (such as decrementing velocity-to-go during fine countdown). It initiates and monitors the lower frequency routines.

Navigation/Guidance Processor

Traditionally, this module runs at the slowest iteration rate (every 990 $\mu$sec) and contains the greatest amount of arithmetic operations. As shown in FIG. 1, it can be subdivided into 3 functions: Compensation, Navigation, and Guidance. The Compensation program corrects the AIRS data for all known errors and transforms that data into an appropriate coordinate frame for Navigation which folds in a model of the earth's gravitational field to produce a vehicle state vector (P, V, $T_N$) for Guidance which combines it with target data to calculate that velocity ($V_R$) required to meet the desired end conditions. The difference between $V_v$ and $V_r$ is called the velocity-to-be-gained ($V_g$) and is passed to the Controls processor. Guidance also computes a desired deployment direction ($1'_c$) for Controls.

Aperiodic Processor

This routine is entered on a semi-regular basis during flight. As indicated, its function is to do target updating in flight under control of the Navigation/Guidance processor. One time calculations (say at the time of launch) could be included here. This processor may be incorporated into the Nagivation/Guidance Processor.

Observations

It is clear that a natural partitioning can be made of the flight program by iteration rate. As FIG. 1 shows, the four highest frequency processors reflect the tradeoff between speed and arithmetic complexity and, more importantly, under the indicated partitioning, the number of inter-processor variables is minimized. Stated another way, it is clear that multiprocessor computing systems can be evaluated on data bus traffic. Advantages inherent in this "divide and conquer" approach would be reduced if the operating system software were burdened by unnecessary intercommunication between functions. Consider the complexity that would result from a separation of Compensation, Navigation and Guidance into distinct processors. Those variables now passed easily from one function to the other within one processor would have to be tagged for time coherence if additional processors were used.

Throughput analyses can be done for each processor. This should be simpler than doing it for a uniprocessor. The resultant system utilization will thus be defined only by the slowest unit, not the aggregate.

As background, it is pointed out that the principal cost elements in previous ICBM hardened computer development programs were the memory subsystem and the circumvention and recovery (C&R) software. In a uniprocessor organization, the desired throughput results in difficult memory requirements for speed and radiation hardness. C&R software, while not overly complex, is too subtle for average programmers. It has been proposed by others to eliminate the software problem through the addition of special hardware which will make the C&R (NEP) function programmer invisible. The mechanization both degrades throughput and requires additional plated wire memory. As an alternative, the multiprocessor organization was felt to offer two important advantages. First, the effective total system throughput could be increased dramatically and, as a result, the memory speed required might be reduced to a point where slow, but hard, semiconductor memories could be used. Secondly, it is conceivable in a multiprocessor organization that C&R could be decentralized to each processor and thereby minimize the probabilities of improper program tagging and linkage back to the wrong place for rollback initiation.

Summary

The summary and conclusions of this section include the following points:

The approach defines tasks by execution frequency.

Throughput is defined by the worst case processor.

Each task processor has its own circumvention and recovery routine.

The speed requirements on hard memory tend to be relieved.

These points form the functional foundation of the multiprocessor concept and will be expanded upon in the next section where the implementation concept is described.

IMPLEMENTATION

This section describes the Multiple Task Oriented Processor system architecture and the method of handling circumvention and recovery. The block diagram of the total computer system and the major components making up a typical processor are discussed. The processing time line of the typical processor with the interaction of task process, circumvention and recovery, and multiprocessor intercommunication/synchronization is explained.

The implementation concept is based on the following:

Task assignment, control hierarchy, and processor intercommunication are interactive and stress:
  Partitioning of the system functional requirements into tasks that minimize both the number and rate of transfer of variables between processors.
  Rapid access to memory within individual processors for local variables and program.
  Efficient access to memory of other processors for global variables.
  Overall memory addressing scheme which simplifies software management.

Multiprocessor Organization

Figure 2:
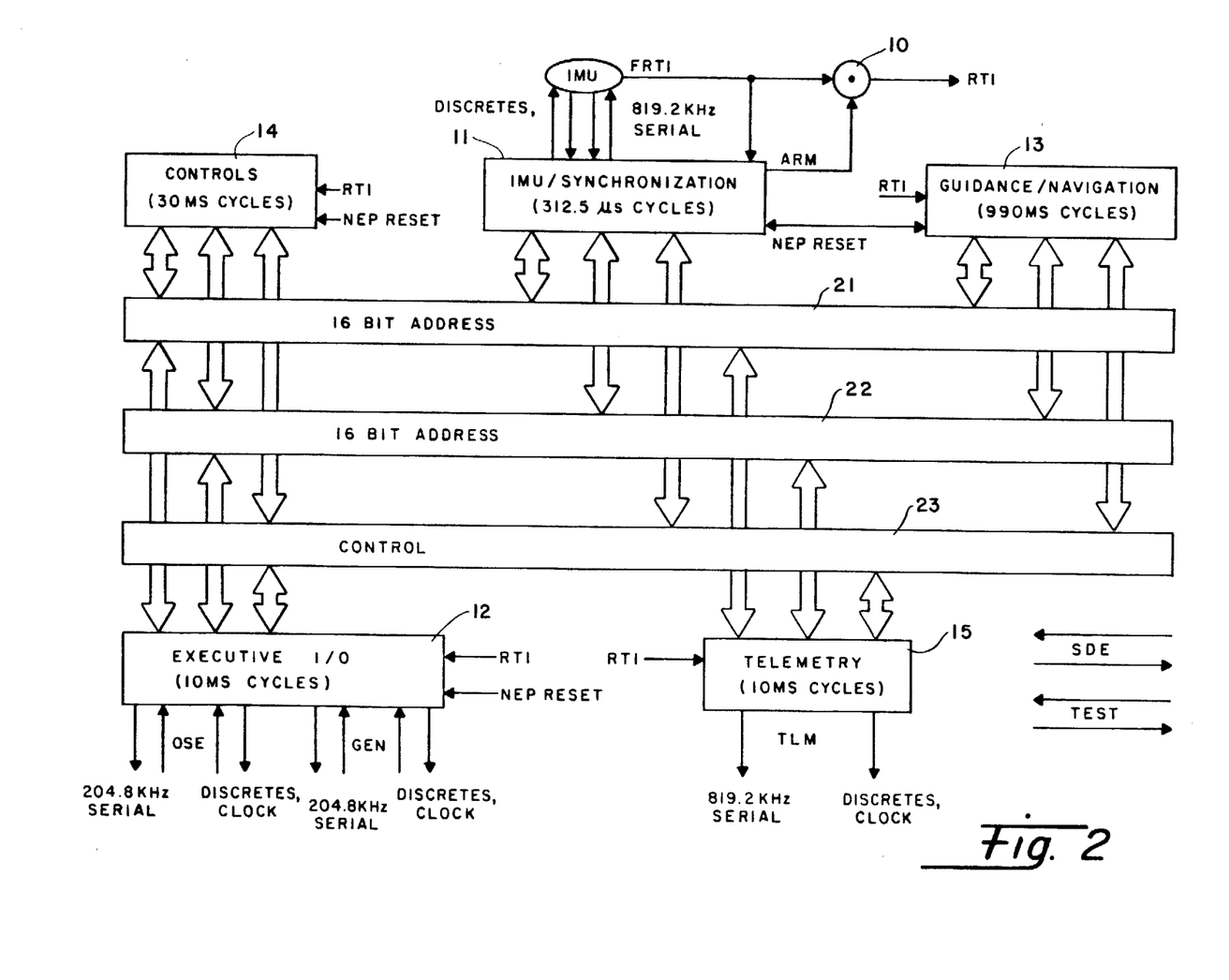
FIG. 2 is a block diagram of a multiple task oriented processor, corresponding to the flow diagram of FIG. 1.

The block diagram of the multiprocessor organization is shown in FIG. 2. The task assignments and rates of computation represent a natural division of the functional requirements of FIG. 1 into processor modules.

The block IMU in FIG. 2 is not a computer processor, but represents the set of apparatus forming the inertial measurement unit to indicate specific force and vehicle attitude. It includes sensing devices and some computational devices. It also includes the system clock which produces a time tick on lead FRTI every 312.5 microseconds. A counting device 10 divides the clock signal to provide a signal on line RTI every 10 milliseconds.

The multiprocessor comprises five parallel processors 11 to 15, with functions shown in corresponding blocks of FIG. 1. The five processors are interconnected via a global bus 20, which comprises an address bus 21, a data bus 22, and a control bus 23. Timing is supplied to all five processors via lead RTI. The NEP RESET line is also connected to all processors. The NEP signal is initiated by the radiation detector and provides (1) the hardware initialization in the form of a reset and (2) a forced program jump on entry into the recovery program. The length of time the NEP signal is active for hardware initialization is a function of the mission senario. Some of the processors also have other input and output lines as shown.

The IMU-Synchronization processor 11 accommodates the serial interface with the block IMU proposed previously for a single processor system. However, it assumes access to the velocity, attitude, and time at a rate at which this data is generated by AIRS, i.e., every 312.5 $\mu$sec rather than the historical 10 msec. The Fine Real Time Interrupt (FRTI) is the 312.5 $\mu$sec time tick from which the 10 msec RTI is derived for use in the multiprocessor synchronization. This ability to define/redefine the RTI aids in reducing post event synchronized startup time. It is assumed that all processor variables are time tagged and coherent and that the algorithms can accommodate the resulting variable time quantitization.

The Executive/IO processor 12 implements the intimate time relationship between the multiprocessor synchronization and the interface with vehicle control, e.g., the precision timers associated with Stage 4 ACS control. This is also the port through which the human can exercise his executive privileges when necessary for override or testing during ground operation. Another function this processor performs is the control of post event restart. Although each processor has its own recovery program initiated by the NEP reset, it is up to the Executive processor to properly orchestrate their coordinated return to task processing.

Representative Processor

Figure 3:
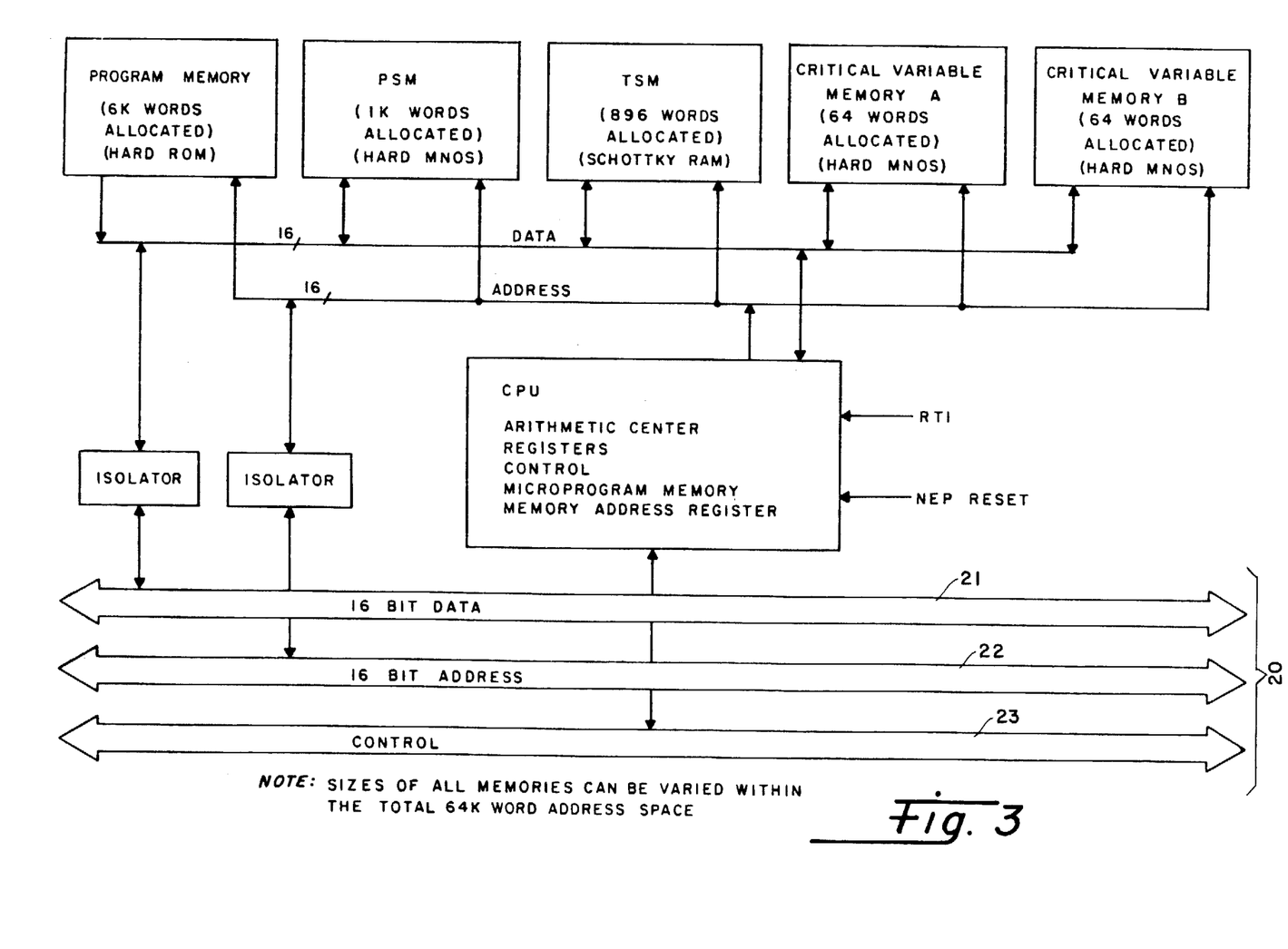
FIG. 3 is a block diagram of a representative processor for use in the system of FIG. 2

The block diagram of an individual processor and its interface with the global bus in shown in FIG. 3.

The processor activity is normally isolated from that of other processors. When a program request with respect to a variable requires access to another processor memory an automatic sequence is initiated to remove the isolation and establish the linkage. The priority of the requestor and the identity of the other processor (keyed by the memory address) is sufficient to allow a combination of interrupt and DMA (Direct Memory Access) control to properly connect the processors through the global bus for efficient data transfer.

The CPU should require no exotic features and can be implemented with a standard architecture that is compatible with an existing commercial instruction set and associated support software.

The memory system can be accessed locally or globally. The processor identity is established by the address space assigned to it for the total of 64K addresses. The block diagram shows an example of an 8K address block assignment.

outputs to the TLM processor will occur during this phase.

In general, data output to other processors during Task Processing or Critical Variable Store will be accomplished by interrupt requesting that the intended receiver processor perform the control of data transfer. This transfer will be DMA in nature with the starting address and number of words residing in specific memory locations of the requesting processor. This relieves the load on the requestor and allows data-block time coherency.

Critical Variable Processing Logic

Figures 4, 4A:
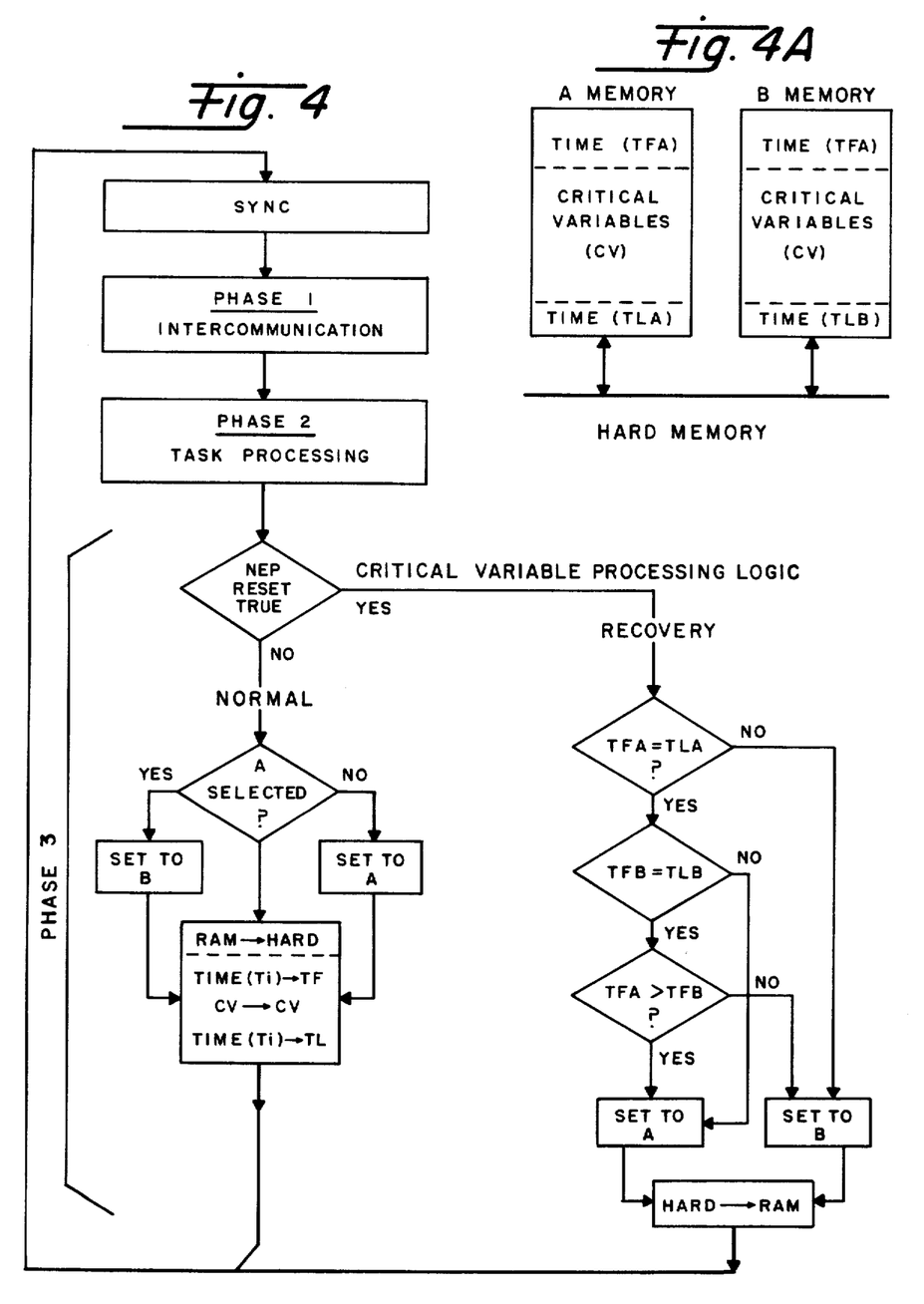
FIG. 4 is a flow chart of the critical variable processing logic.
FIG. 4A shows the memory layout of the critical memory.

The method of storing critical variables during normal computation and their restoration into RAM working store during recovery is shown in FIG. 4.

The storing into hard memory alternates between A and B on successive processor iterations. The variables resulting from each iteration are time tagged and this time is used to bracket the data stored, i.e., store Ti, store data, store Ti. The setting of A or B write (normal) or read (recovery) is accomplished by selecting one of two base addresses. The combination of time tag and base addressing eliminates the need for a separate hard memory pointer.

The sequential nature of the process allows the recovery algorithm to determine whether data in A or B is valid and which data is most recent. The first storage of time in A (TFA=Ti) will be the same as the last time storage of time in A (TLA=Ri) if no event occurred during any store into A. The data when restored into RAM working store contains the time tag of that point in time for which the data was valid. This allows the recovery, executive, or normal processing to account for the process downtime and to effect remedial action

Typical Processor Time Line

A typical processor time line is shown below.

| SYNC | | TIME - | | SYNC |
|---|---|---|---|---|
| | INTERCOMMUNICATION | TASK PROCESSING | CV TO HARD STORE | |
| | REQUEST DATA INPUT FROM OTHER PROCESSORS | REQUEST DATA OUTPUT TO EXEC/IO PROCESSOR | REQUEST DATA OUTPUT TO TLM PROCESSOR | |

MULTIPROCESSOR SYNCHRONIZATION
- EACH PROCESSOR HAS ITS OWN R77 DRIVEN EXECUTIVE WHICH DEFINES ITS UNIQUE TASK SYNC
- THE EXEC/IO PROCESSOR HAS A R77 DRIVEN EXECUTIVE WHICH DEFINES AND CONTROLS THE SYNCHRONIZATION OF THE MULTIPROCESSOR EXECUTIVES

INTERPROCESSOR-BUS ACCESS REQUESTS
- THE PROCESSORS ARE ASSIGNED REQUEST PRIORITIES
- THE EXEC/IO PROCESSOR HAS THE HIGHEST PRIORITY

The end point synchronization is controlled by the individual processor and coordinated with other processors through the EXEC/IO processor 12. The typical processor sequentially performs three activity phases.
- Intercommunication—General input of data and forcing functions from other processors/interfaces required to perform the assigned task.
- Task Processing—Processing of the task algorithm with outputs only to EXEC/IO processor (or interfaces), i.e., vehicle control/health, IMU control, executive sequencing, etc.
- Critical Variable Store—Storage of task generated data/status into hard storage. This includes everything required to properly recover and restart task processing and to reestablish vehicle control. Since this is the primary data required for telemetry, as required.

Technology

The question still remaining is the availability of reliable, high performance parts with which to fabricate the multiprocessor while meeting the nuclear environmental requirements. This problem is addressed in this section. It is instructive at this point to review the application of the parts and their assumed characteristics.

Program Memory

The typical program memory is composed of ROM's and/or PROM's. The program memory contains the instructions required to perform the specific task assigned to the processor. During recovery, the memory contains the instructions required to reestablish critical variables and synchronization unique to the processor task in the post event/pre-restart time interval. Survivability and latchup are solved at the system rather than at the chip level.

CPU

The typical CPU is composed of components from commercially available bipolar microprocessor/bit slice families. It is assumed that minimum or no modifications to the commercial processes are required to successfully cope with the radiation environment. The emphasis in design philosophy is to counter or circumvent radiation effects at the system level rather than at the chip level, where possible. This is feasible with an LSI implementation but would be difficult, if not impossible, to achieve with MSI/SSI due to the large number of parts to be managed.

Permanent Storage Memory (PSM)

The PSM is composed of hard MNOS devices.

Critical Variable Memory (CVM)

The CVM is not used during task processing but subsequent to it. During the time interval allocated solely to the preservation of task critical variables, time-tagged variables residing in the soft TSM will be transferred to one of two hard nonvolatile CVM memories. The CVM will be read only after an event to reestablish the TSM working storage during the recovery program. Since the CVM is not used in task processing, its write cycle time can be relatively slow compared to that of the soft TSM RAM. This allows the consideration of using MNOS on bulk silicon technology for this memory function.

Digital Logic Technology

Low power Schottky TTL and I$^2$L are the leading candidates for the digital logic technology. They are both bipolar technologies and offer the best combination of maturity, availability, and performance. The 2901 family of parts (LSTTL) from AMD and other sources is the most popular bit slice family today. It is high speed, it is a mature process, and it is readily available. The 9900 and 9440 are both 16-bit microprocessors (I$^2$L) available from TI and Fairchild, respectively. A limited amount of radiation test data has been taken on these devices that indicates a reasonable amount of tolerance.

AMD 2901A Results

A quote from the 1978 GOMAC Digest of Papers summarizes the results of the AFWL (Air Force Weapons Laboratory) tests:

"The 2901A exhibited minimal propagation delay increases, small output drive current decreases, and no power supply current increases after Co-60 and neutron exposure. Even being an unhardened commercial microprocessor, the 2901A which survives $10^{14}$ n/cm$^2$ and $3\times 10^6$ Rads(Si) total dose ($>9\times 10^6$ if unbiased), has sufficient radiation performance to meet many systems needs."

Fairchild 93425 Results

The results of the AFWL rad testing of the 93425 as presented at GOMAC 1978 are as follows:
Neutron fluence for failure (n/cm$^2$): $3\times 10^{14}$
Total ionizing dose for failure (rads): $>5\times 10^5$
Logic upset threshold (L) (rads(Si)/sec): $8\times 10^7 < L < 2\times 10^8$
Memory upset threshold (M) (rads(Si)/sec): $2\times 10^8 < M < 4\times 10^8$

TI 9900 Results

The results of the NWSC rad testing of the TI 9900 indicate the following performance may be achievable:
Neutron fluence for failure (n/cm$^2$): $\geq 5\times 10^{13}$
Total ionizing dose for failure (rads): $\geq 10^6$
Transient upset threshold (rads(Si)/sec): $\geq 10^8$

Non-Volatile Memory Technology

Data indicates that there are MNOS/bulk IC's in production (AFML Manufacturing Technology Program at Westinghouse) that survive 100K rads(Si) total dose and $10^{10}$ rads(si)/sec dose rate. (The $10^{10}$ rads(Si)/sec was the limit of the radiation simulation facility). These parts are fabricated with a mature process, have been screened to 38510 Class B, and can be written in less than 40 $\mu$s with reasonable retention. Therefore, the MNOS/bulk technology will be used for the permanent store memory (slow write, long retentivity storage of target constants, IMU calibration parameters, etc.) and for the critical variable memory (50 $\mu$sec clear/write with greater than one hour retentivity).

The 1K EARAM device being manufactured for AFML can be increased in hardness several ways, but the most meaningful changes are those which do not significantly affect the existing high yield (manufacturability) of the part. With this guideline, the total dose performance can be changed favorably by starting with lower initial nonmemory device thresholds. Since a "built-in" voltage margin of operation exists in the 1K chip, lowering the threshold increases this, thus increasing the circuit tolerance to radiation. Additionally, shortening the channel length of the memory FETS increases the current drive to the sense amplifier, allowing the chip to remain "on the air" at higher doses. Harder oxides can be used to minimize the threshold shifts of devices in the control circuits. Lastly, to improve transient performance, shallower diffusions in device areas and bit lines would limit photocurrent generation by a factor proportional to the diffused surface area changes.

Burnout Prevention

The multiple Task Oriented Processor is based on junction isolated logic and memory technology. Therefore, a system design approach must be developed to prevent catastrophic failure of the IC's. The failure can occur in two ways (1) junction or metalization burnout caused by photocurrent generated by prompt ionizing dose and (2) latchup of four layer structures which will lead to burnout. The prompt burnout can be prevented if the power supply current is limited to a safe level.

Preliminary calculations indicate that if the current is limited to 1 amp per IC for no more than 1 $\mu$sec the devices will burn out. In order to guarantee that devices in latchup will recover, $V_{cc}$ must be reduced to a level of less than one diode voltage drop or about 0.7 V at room temperature. $V_{cc}$ removal can be accomplished by series and shunt switches or by high slew rate local voltage regulators. The latter concept offers advantages in voltage regulation and noise suppression.

The design goal for a power distribution system for use with junction isolated integrated circuits is low impedance busing to minimize capacitive energy storage requirements which in turn reduces $V_{cc}$ switching constraints and overall quantities of filtering components.

SUMMARY

The choice of semiconductor technology to be used in building electronics for a missile computer must address two application areas, viz., logic and memory. System design should attempt to maximize performance while minimizing demands placed on semiconductor technologists in each of these catagories. To assist system designers in this effort, certain prerequisites must be placed on technologies which are to be considered for use in missile systems. These are availability, reliability, performance, and hardness.

When one considers these technology prerequisites, bipolar technology offers the best choice for logic in missile applications. Because of severe limitations on the ability to implement bipolar LSI in dielectrically isolated wafers (the method historically used to prevent transient radiation induced latchup in junction isolated IC's), it is assumed that a system level approach will henceforth be taken to this problem. Specifically, it is assumed that off-chip current limiting will be employed to protect chips during intense but short lived transient radiation events, followed by power cycling to interrupt any latchup which may have occurred. Under these assumptions, conventional commercial circuit designs and processes can be used, taking full advantage of existing reliability data and software experience.

With respect to non-volatile memory, the major prerequisite still to be addressed is hardness. The MNOS/bulk device being manufactured for AFML shows potential of meeting the requirments of the Multiple Task Oriented Processor with minimum circuit design and process changes.

In summary, it can be seen that the multiprocessor implementation concept will enhance performance, simplify circumvention and recovery (NEP) and eliminate the need for plated wire memory. The software aspects are manageable and should allow ease of validation and verification.

Thus, while preferred constructional features of the invention are embodied in the structure illustrated herein, it is to be understood that changes and variations may be made by the skilled in the art without departing from the spirit and scope of my invention.

We claim:

1. A computer system comprising a plurality of processors operating in parallel and interconnected via a global bus, which may be subject to a short duration radiation event, each processor having its own cycle time, with synchronization by connection to a system clock, the system being partitioned by functional requirements into tasks that minimize both the number and rate of transfer of variables between processors;

wherein each of said processors comprises a central processing unit, a program memory comprising read only memory devices, a permanent storage memory comprising MNOS devices, a temporary storage memory comprising fast, volatile, bipolar random access memory devices, critical variable memory means comprising first and second memories of MNOS devices, and a local bus interconnecting the central processing unit and said memories, and isolating means coupled between the local bus and the global bus for providing isolation between them, there being means actuated in response to a program request with respect to a variable requiring access to another of said processors to initiate an automatic sequence to remove the isolation at said isolation means and to establish a linkage;

wherein said MNOS devices comprise memory field effect transistors which in the permanent storage memory are used with a slow write for long retentivity storage of constants including target constants and IMU calibration parameters, and in the critical variable memory means are used with approximately a 50-microsecond clear/write time to provide greater than one hour retentivity, the MNOS devices having relatively reduced thresholds, the memory field effect transistors having channels of a short length, harder oxides, and relatively shallow diffusions in device areas and bit lines, the processors further having digital logic circuits of a bipolar type selected from low power Schottky TTL and $I^2L$;

each processor cycle having a sync time for synchronization with the other processors, followed in sequence by three activity phases, comprising a first activity phase for intercommunication, a second activity phase for task processing, and a third activity phase for critical variable storage;

wherein within each of said processors, said first and second memories respectively have first and second base addresses, there being means effective during normal processing for storage of critical variables from the temporary storage memory into the critical variable memory means during said third phase in which the storage alternates between the first and second memories on successive processor iterations by means for determining the base address used in the previous iteration and changing to the other, in which the critical variable resulting from each iteration are time tagged and this time is used to bracket the data stored by means for storing a first time value, then storing data, and then storing a last time value, the first and last time values being the same during a cycle provided no radiation event has been detected during the storage sequence;

means actuated in response to passage of one of said radiation events which causes loss of information in the temporary memory store to enter a recovery program, wherein the program includes means to determine whether data in the first or second memory is valid and which is most recent by means for comparing the first and last time values for the first memory, if they are not equal setting the base address to that of the second memory, and alternatively if they are equal to then compare the first and last time values for the second memory, if they are not equal setting the base address to that of the first memory, and alternatively if they are equal to then compare the first time values for the first and second memories and setting the base address to the one of the first and second memories for which the time value is greater, the data being read from the first or second memory of the critical variable memory means as determined by the base address setting and written into the temporary storage memory with the time tag of that point in time for which the data is valid, which allows the recovery, executive, or normal processing to account for the process downtime and to effect remedial action as required;

whereby the combination of time tag and base addressing eliminates any need for a separate pointer for the critical variable memory means.

2. The computer system according to claim 1, which includes junction isolated logic and memory technology, wherein burnout prevention relating to said radiation event includes power supply means in which current is limited to one ampere per IC for no more than one microsecond, and wherein $V_{cc}$ is reduced to a level of less than on diode voltage drop or about 0.7 volt at room temperature to ensure that devices in latchup will recover.

* * * * *

UNITED STATES PATENT AND TRADEMARK OFFICE
CERTIFICATE OF CORRECTION

PATENT NO.   :   4,591,976

DATED        :   May 27, 1986

INVENTOR(S)  :   Douglas G. Webber et al

It is certified that error appears in the above-identified patent and that said Letters Patent is hereby corrected as shown below:

At column 10, lines 15 and 16, "relatively" should be deleted.

Signed and Sealed this

Twenty-third Day of September 1986

[SEAL]

Attest:

DONALD J. QUIGG

Attesting Officer

Commissioner of Patents and Trademarks